United States Patent [19]

Koto

[11] 4,354,708
[45] Oct. 19, 1982

[54] REAR TIRE HOUSE STRUCTURE FOR FREIGHT VEHICLE BODIES

[75] Inventor: Masaaki Koto, Hiroshima, Japan

[73] Assignee: Toyo Kogyo Co., Ltd., Hiroshima, Japan

[21] Appl. No.: 177,433

[22] Filed: Aug. 12, 1980

[30] Foreign Application Priority Data

Aug. 16, 1979 [JP] Japan .................. 54-104865

[51] Int. Cl.$^3$ .................................. B62D 27/00
[52] U.S. Cl. ........................ 296/185; 280/152 R; 296/198
[58] Field of Search ........... 296/198, 185, 191, 37.2; 280/152 R, 153 R

[56] References Cited

U.S. PATENT DOCUMENTS 2,073,058  3/1937  Greene ........................ 296/198

FOREIGN PATENT DOCUMENTS 542640  1/1942  United Kingdom ............ 296/198

Primary Examiner—Joseph F. Peters, Jr.
Assistant Examiner—John A. Carroll
Attorney, Agent, or Firm—Fleit & Jacobson

[57] ABSTRACT

An automobile body having a rear tire house structure including an outer tire house panel and a floor panel. The outer tire house panel is so shaped that it can be used with a tire of larger diameter for a single-tired wheel arrangement and the floor panel is formed at a transversely outer edge with a cut-out which is of a transverse width sufficient to receive wheels for double-tired arrangement and a longitudinal length sufficient to accommodate the larger diameter tire. An inner tire house panel is provided between the outer tire house panel and the floor panel and may have a configuration corresponding to that of the outer tire house panel to define a tire compartment for a large diameter single-tired arrangement or a configuration of no or small projection suitable for a small diameter double-tired arrangement.

7 Claims, 7 Drawing Figures

REAR TIRE HOUSE STRUCTURE FOR FREIGHT VEHICLE BODIES

The present invention relates to automobile bodies and more particularly to freight vehicle body structures. More specifically, the present invention pertains to rear tire house structures for freight vehicle bodies.

In freight vehicles such as trucks, wagons and van-type vehicles, it has been considered advisable to adopt a double-tired rear wheel arrangement in view of the fact that it becomes possible to use tires of smaller diameter and consequently provide a substantially flat floor with tire houses of minimum projection. However, there still exists a preference to a single-tired rear wheel arrangement since this type of arrangement provides a convenience for tire replacement.

It is therefore an object of the present invention to provide rear tire house structures for freight vehicle bodies wherein substantial part of structural body members can commonly be used both in vehicles having double-tired and single-tired rear wheel arrangements.

According to the present invention, the above and other objects can be accomplished by an automobile body structure including a rear tire house structure at each side of the body structure, said rear tire house comprising an outer tire house panel which is so shaped that it can be used with a tire of larger diameter for a single-tired wheel arrangement, a floor panel formed at a transversely outer edge with a cut-out which is of a transverse width sufficient to receive wheels for double-tired arrangement and a longitudinal length sufficient to accommodate the large diameter tire, and an inner tire house panel connected with said outer tire house panel and said floor panel for defining a space for rear wheel arrangement. Where the structure is applied to a single-tired rear wheel arrangement, the inner tire house panel may be so shaped that it corresponds to the shape of the outer tire house panel so that a compartment is provided for a single large diameter tire. In this instance, the inner tire house panel has a curvature which provides a projection beyond the floor panel. Where the structure is applied to a double-tired rear wheel arrangement, the inner tire house panel may have a flat surface which may be coplanar with the floor panel or only a small projection which is sufficient for a double-tired arrangement.

According to the present invention, the outer tire house panel and the floor panel can commonly be used both for the vehicles having the single-tired and double-tired rear wheel arrangements, respectively. Through an appropriate selection of the inner tire house panel, it is possible to build a vehicle having a single-tired rear wheel arrangement or a double-tired arrangement.

The above and other objects and features of the present invention will become apparent from the following descriptions of preferred embodiments taking reference to the accompanying drawings, in which.

Figure 1:
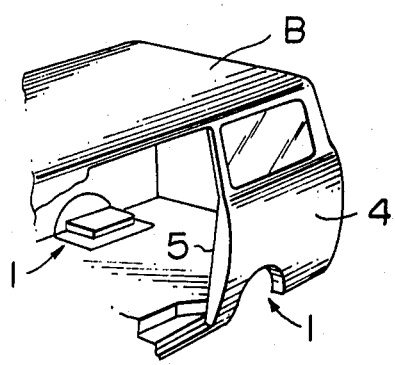
FIG. 1 is a fragmentary perspective view of an automobile to which the present invention can be applied.
Figure 2:
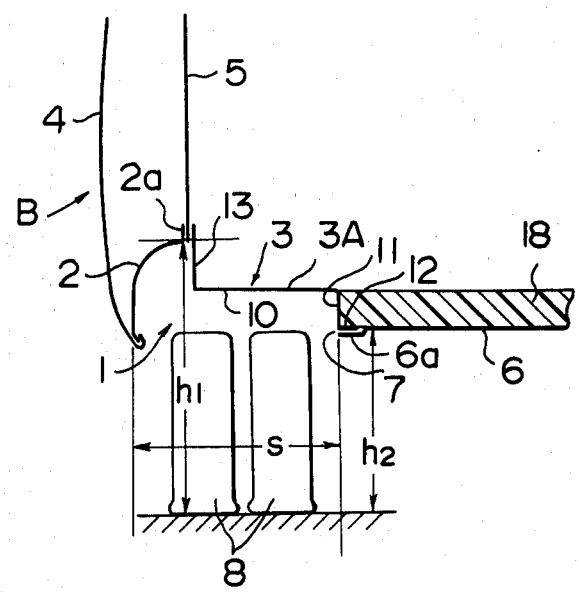
FIG. 2 is a sectional view of one embodiment of the rear tire house structure for a double-tired arrangement.
Figure 3:
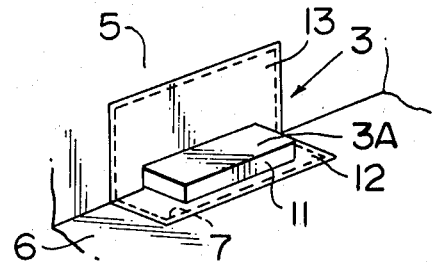
FIG. 3 is a perspective view of an inner tire house panel as used in the embodiment of FIG. 2.

Referring to the drawings, particularly to FIG. 1, there is shown an automobile body B having a rear tire house structure 1 at each side thereof. As shown in FIG. 2, the body B includes a side panel assembly comprised of an outer panel 4 and an inner panel 5, and the rear tire house structure 1 includes an outer tire house panel 2. The body B further includes a floor panel 6 formed at each side edge with a cut-out 7 which may be of a rectangular configuration. The width of the cut-out 7 is so determined that a double-tired rear wheel assembly can be received therein without any interference. Further, the cut-out 7 has a longitudinal length which is sufficient for a large diameter tire that may be used for a single-tired arrangement.

At the cut-out 7 of the floor panel 6, there is disposed an inner tire house panel 3. In the arrangement shown in FIG. 2, the inner tire house panel 3 has a horizontal flange 12 which is welded to the floor panel 6 at the edge portion 6a of the cut-out 7. Further, the panel 3 has a vertical wall 13 which is welded to the lower edge of the body inner panel 5 together with an inner peripheral flange 2a which is formed for the purpose in the outer tire house panel 2. The inner tire house panel 3 is further formed with a projection 3A which is defined by a vertical wall 11 and a flat surface 10. The outer tire house panel 2 is so shaped and located that the upper edge portion thereof is vertically distant from the ground level by a distance $h_1$ which is sufficient for receiving a large diameter tire for a single-tired arrangement. Further, the outer tire house panel has a lower edge which is of an arcuated configuration having a diametrical dimension W sufficient for receiving the large diameter tire.

In the arrangement shown in FIG. 2, the rear wheel assembly is of a double-tired type having a pair of tires 8 of a small diameter. The floor panel 6 is located at a level $h_2$ which is substantially the same as the diameter of the tire 8. It is of course possible to locate the floor panel 6 even at a level lower than the diameter of the tire 8. It will thus be understood that the outer tire house panel 2, the projection 3A of the inner tire house panel 3 and the cut-out 7 of the floor panel 6 define a room for the double-tired rear wheel arrangement. On the floor panel 6, there may be located a floor lining board 18 which may be of a thickness substantially equal to the height of the vertical wall 11 so as to define a substantially flat floor surface.

Figure 4:
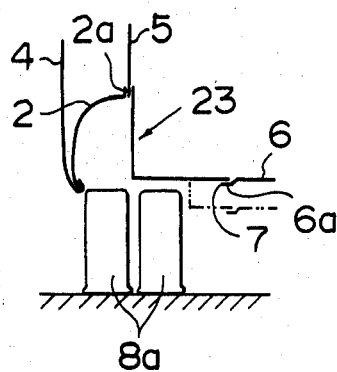
FIG. 4 is a sectional view similar to FIG. 2 but showing another embodiment for a double-tired arrangement.
Figure 5:
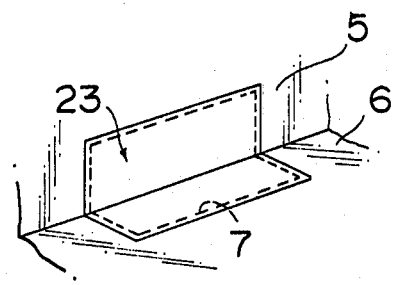
FIG. 5 is a perspective view of an inner tire house panel as used in the embodiment of FIG. 4.

Referring to FIG. 4, there is shown a rear wheel arrangement which includes a pair of tires 8a each having a diameter smaller than that of the tire 8 in the previous embodiment. In this embodiment, there is disposed an inner tire house panel 23 which is of a L-shaped cross-sectional configuration as shown in FIG. 5.

Figure 6:
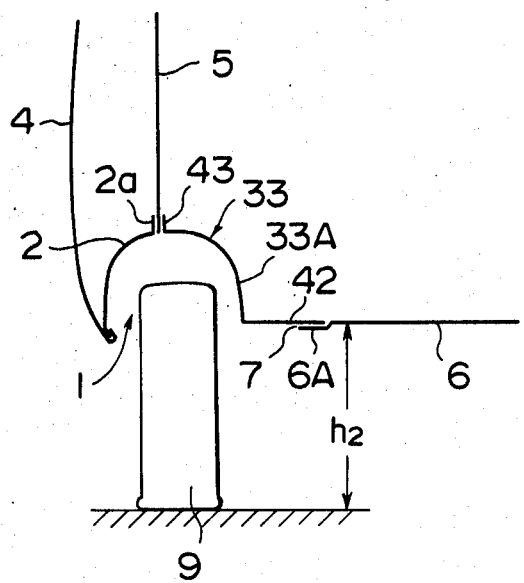
FIG. 6 is a sectional view similar to FIGS. 2 and 4 but showing an embodiment for a single-tired arrangement; and, FIG. 7 is a perspective view of an inner tire house panel as used in the embodiment of FIG. 6.
Figure 7:
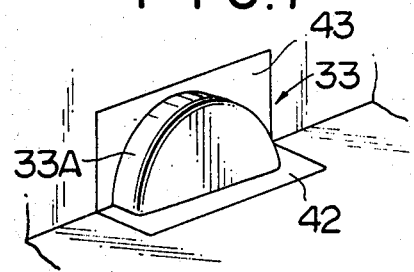

Referring now to FIGS. 6 and 7, there is shown an embodiment having a single-tired rear wheel arrangement. In this embodiment, the tire house structure includes an inner tire house panel 33 having a horizontal flange 42 adapted to be welded to the edge portion 6a of the cut-out 7 of the floor panel 6 and a vertical wall 43 adapted to be welded to the lower edge of the body inner panel 5. The panel 33 is further formed with a bulged portion 33A which is so formed as to define a tire compartment for a large diameter tire 9 for a single-tired wheel arrangement together with the outer tire house panel 2.

According to the arrangements described above, the floor panel can be located as low as possible for facilitating loading and unloading operations provided that a space be maintained beneath the floor panel for arranging power transmitting parts such as the propeller shaft, the differential gear unit and the driving wheel axles. It should further be noted that the structural parts other than the inner tire house panel can be used commonly for a vehicle having a single-tired rear wheel arrangement and a vehicle having a double-tired rear wheel arrangement.

The invention has thus been shown and described with reference to specific embodiments, however, it should be noted that the invention is in no way limited to the details of the illustrated structures but changes and modifications may be made without departing from the scope of the appended claims.

I claim:

1. An automobile body structure including a rear tire house structure at each side of the body structure, said rear tire house structure comprising an outer tire house panel which is so shaped that it can be used with a tire of a first diameter for a single-tired wheel arrangement, a floor panel formed at a transversely outer edge with a cut-out which is of a transverse width sufficient to receive tires of a diameter smaller than the first diameter for a double-tired arrangement and a longitudinal length sufficient to accommodate the first diameter tire, and an inner tire house panel connected with said outer tire house panel and said floor panel for defining a space for rear wheel arrangement, said inner tire house panel being of a substantially L-shaped cross-sectional configuration having a horizontal flat surface coplanar with the floor panel so that a substantially flat loading floor is defined by the floor panel and the flat surface of the inner tire house panel.

2. An automobile body structure including a rear tire house structure at each side of the body structure, said rear tire house structure comprising an outer tire house panel which is so shaped that it can be used with a tire of a first diameter for a single-tired wheel arrangement, a floor panel formed at a transversely outer edge with a cut-out which is of a transverse width sufficient to receive tires of a diameter smaller than the first diameter for a double-tired arrangement and a longitudinal length sufficient to accommodate the first diameter tire, and an inner tire house panel connected with said outer tire house panel and said floor panel for defining a space for rear wheel arrangement, said inner tire house panel having a projection defined by a vertical peripheral wall and a flat horizontal surface surrounded by the vertical wall, said projection being located in the cut-out of the floor panel so as to define together with the outer tire house panel a compartment for the double-tired wheel arrangement.

3. An automobile body structure including a side wall and a rear tire house structure at each side of the body structure, said rear tire house structure comprising an outer tire house panel which is so shaped that it can be used with a tire of a first diameter for a single-tired wheel arrangement, a floor panel formed at a transversely outer edge with a cut-out which is of a longitudinal length sufficient to accommodate the first diameter tire, an inner tire house panel connected with said outer tire house panel and said floor panel for defining a space for rear wheel arrangement, said inner tire house panel having a vertically extending wall portion which is substantially coplanar with said side wall of the body structure and a horizontally extending wall portion extending transversely inwardly from lower edge portion of the vertically extending wall portion to define a substantially flat area under which tires of a diameter smaller than the first diameter are adapted to be arranged for a double-tired arrangement.

4. An automobile body structure in accordance with claim 3 in which said inner tire house panel is of a substantially L-shaped cross-sectional configuration having a horizontal flat surface coplanar with the floor panel so that a substantially flat loading floor is defined by the floor panel and the flat surface of the inner tire house panel.

5. An automobile body structure in accordance with claim 3 in which said inner tire house panel has a projection defined by a vertical peripheral wall and a flat horizontal surface surrounded by the vertical wall, said projection being located in the cut-out of the floor panel so as to define together with the outer tire house panel a compartment for a double-tired arrangement.

6. An automobile body structure in accordance with claim 5 in which floor lining board is provided on the floor panel, said board having a thickness substantially equal to height of the vertical wall of the projection in the inner tire house panel so as to provide a substantially flat loading surface together with the flat surface of the projection in the inner tire house panel.

7. An automobile body structure including a rear tire house structure at each side of the body structure, said rear tire house structure comprising an outer tire house panel which is so shaped that it can be used with a tire of a relatively large diameter for a single-tired wheel arrangement, a floor panel formed at a transversely outer edge with a cut-out which is of a transverse width sufficient to receive wheels for a double-tired arrangement and a longitudinal length sufficient to accommodate the large diameter tire, an inner tire house panel connected with said outer tire house panel and said floor panel for defining a space for rear wheel arrangement, said inner tire house panel being formed with a bulged portion which is so shaped that it corresponds to the shape of the outer tire house panel so that a compartment is provided for a single large diameter tire, said inner tire house panel being further formed around said bulged portion with a horizontal portion which is substantially flush with and connected to said floor panel.

* * * * *